United States Patent [19]

Buckholtz

[11] Patent Number: 4,997,638

[45] Date of Patent: Mar. 5, 1991

[54] PRODUCTION OF HEXAMETAPHOSPHATES FROM OTHER PHOSPHATES

[75] Inventor: Harry E. Buckholtz, Lewiston, N.Y.

[73] Assignee: Occidental Chemical Corporation, Niagara Falls, N.Y.

[21] Appl. No.: 535,623

[22] Filed: Jun. 11, 1990

[51] Int. Cl.$^5$ .................. C01B 15/16; C01B 25/26
[52] U.S. Cl. ................................................. 423/314
[58] Field of Search ........................................ 423/314

[56] References Cited

U.S. PATENT DOCUMENTS 4,126,665 11/1978 Ropp ................................. 423/314
4,162,360 7/1979 Adrian et al. ..................... 423/314

FOREIGN PATENT DOCUMENTS 700084 12/1984 Canada .............................. 423/314

Primary Examiner—Gregory A. Heller
Attorney, Agent, or Firm—James F. Tao; Richard D. Fuerle

[57] ABSTRACT

Disclosed is a method of making hexametaphosphates by reacting sodium tripolyphosphate, tetrasodium pyrophosphate, or trisodium phosphate with phosphoric acid, forming a molten glass of said mixture, and chilling said molten glass to form a solid.

14 Claims, No Drawings

PRODUCTION OF HEXAMETAPHOSPHATES FROM OTHER PHOSPHATES

BACKGROUND OF THE INVENTION

This invention relates to a low energy method of making hexametaphosphates from sodium tripolyphosphate (STPP), tetrasodium pyrophosphate (TSPP), or trisodium phosphate (TSP). In particular, it relates to a method of making sodium hexametaphosphate (SHMP) from those phosphates when they are off-spec.

STPP is normally made by mixing together soda ash ($Na_2CO_3$) and/or caustic soda (NaOH) with phosphoric acid in a molar ratio of 5 sodium to 3 phosphorus, followed by removal of the free water, then dehydration of the bound water. Dehydration is accomplished by calcining without melting at a temperature of about 410° to about 500° C. In a large commercial facility for producing STPP, large quantities of off-spec STPP can be made.

Material can be "off-spec" for many reasons, but the most common reasons are that it is too finely powdered, too lumpy, does not contain the desired amount of Phase I content, has excessive pyrophosphate, short chain or insoluble metaphosphates, or a carbonaceous impurity content which produces an unacceptable color, or has a density which is too high or too low. This off-spec material cannot be easily sold commercially and must be otherwise disposed of.

At the present time there are a number of ways of disposing of off-spec STPP, none of which are entirely satisfactory. Off-spec STPP can be redissolved, hydrolyzed to orthophosphate, and reprocessed, but this treatment requires a great deal of energy to evaporate the water a second time. Furthermore, filtration and/or adsorption with carbon may be required to reduce high impurity levels. Another way of disposing of the off-spec STPP, when the off-spec STPP is too fine, is to compact the powder into larger flakes using large compacting machines. However, the properties of the compacted powder are not as good as on-spec STPP because the compacted powder particles tend to be too brittle and too dense. Compaction or agglomeration are unacceptable methods for dealing with STPP whose pyrophosphate, metaphosphate, or non-phosphate impurity levels are too high. A third method of disposing of off-spec STPP is to recycle it into the calciner and spray it with water or sodium phosphate to agglomerate it. While in many cases this produces an adequate product, it reduces the capacity of the plant to produce STPP because it reduces the quantity of fresh feed that the calciner can accept.

SUMMARY OF THE INVENTION

I have discovered a process by which STPP, TSPP, or TSP can be reacted with phosphoric acid to produce hexametaphosphates (which are also known as glassy phosphates or SHMP). Not only can the process of this invention utilize large amounts of off-spec STPP that are accumulated in the production of STPP, but the process also produces SHMP, which is a more valuable product than STPP. Moreover, there are no significant differences between the SHMP produced by the process of this invention and SHMP produced by standard commercial processes.

A major advantage of the process of this invention over the conventional process for making SHMP is that the amount of energy consumed by the process of this invention is significantly less than the amount of energy consumed in the conventional process because less water must be evaporated. This is evident when the equation for the conventional route for making SHMP, $8Na_2CO_3 + 14H_3PO_4 \rightarrow Na_{16}P_{14}O_{43} + 8CO_2 + 21H_2O$, is compared to the equation for the preferred route of this invention, $3.2Na_5P_3O_{10} + 4.4H_3PO_4 \rightarrow Na_{16}P_{14}O_{43} + 6.6H_2O$, which shows that 14.4 fewer moles of water must be evaporated using the process of this invention. The equations also show that the process of this invention utilizes 9.6 fewer moles of phosphoric acid and no soda ash. Energy is also saved in the process of this invention because energy is required to form the –PO– links in SHMP and some of those links are already formed in the STPP starting material. Furthermore, the SHMP process is necessarily operated at such high temperatures in order to form the metaphosphate chains that it destroys carbonaceous impurities, which exit the phosphate furnace as $CO_2$. Likewise, pyrophosphates, orthophosphates, or short chain insoluble metaphosphates which may have caused STPP to be off-spec are readily consumed in the glassy phosphate process by converting them to long chain soluble metaphosphates.

DETAILED DESCRIPTION OF THE INVENTIoN

The starting material for use in this invention is sodium tripolyphosphate (STPP) which has a formula $Na_5P_3O_{10}$, tetrasodium pyrophosphate (TSPP), which has the formula $Na_4PO_7$, or trisodium phosphate (TSP), which has a formula $Na_3PO_4$ STPP is preferred to TSPP and TSPP is preferred to TSP. The preferred starting material is off-spec STPP, TSPP, or TSP as that is the material that constitutes the utilization problem. The material may be off-spec in any number of ways, but the most common ways are (1) the particle size is too fine, i.e., the particles will pass through a 100 mesh screen;

(2) the density is too great, i.e., greater than about 0.9 g/cc, or the density is too low, i.e., less than about 0.4 g/cc;

(3) the Phase I content is greater than about 40 wt% or less than about 24 wt% (The Phase I content is the percentage of material which exhibits a rapid rate of hydration in the phosphate);

(4) it contains more than 6 wt% tetrasodium pyrophosphate, more than 0.1 wt% insolubles, or has a $P_2O_5$ content of less than 56.5 wt%, or (5) it is off-color due to organic or carbonaceous soot contamination.

In the process of this invention the phosphate is mixed with phosphoric acid to form a slurry. The proportion of the phosphate to the phosphoric acid is selected so that the phosphate reacts with the phosphoric acid to form water and a compound having the formula $Na_{x+2}P_xO_{3x+1}$ where x is between about 12 and about 18, and preferably is about 14 because that compound has the best properties, such as quick solubility, better sequestering, and lack of insolubles. The proportion of phosphate to phosphoric acid used will depend upon the particular phosphates selected, but for STPP the proportions are about 3.2 moles STPP to about 4.4 moles phosphoric acid:

$$3.2\ Na_5P_3O_{10} + 4.4\ H_3PO_4 \rightarrow Na_{16}P_{14}O_{43} + 6.6\ H_2O.$$

The mixing of the phosphate and the phosphoric acid can be performed at room temperature. The mixture or its components are placed in a furnace to drive off the water and form a molten glass. Typically, this requires a temperature of about 900° to about 1200° C. for about 10 to about 90 minutes. Alternatively, the phosphate and the phosphoric acid can be mixed directly in the furnace. After the molten mixture is expelled from the furnace it is quickly chilled to cause the formation of a glass. Quick chilling can be accomplished by a variety of methods including, for example, passing the molten glass over a chill wheel, which is a drum cooled on the inside with cold water. The molten glass solidifies on the drum and shatters; it can then be ground to the desired particle size.

The product can be used for a variety of purposes such as, for example, to treat water, as bath beads, as a water softener, and to treat fibers used in making textiles. It can also be used to make aqueous slurries of substances such as coal and kaolin more pumpable.

The following examples further illustrate this invention.

EXAMPLE 1

Sodium tripolyphosphate (92.0 g) was combined with 44.2 g of 85 wt% $H_3PO_4$ and 94.5 g of water. The solution was evaporated to dryness in an oven at 120° C. Solid produced Was placed in a platinum dish and heated at 1000° C. for about one hour. The resulting melt was quick chilled by pouring it onto a cooled stainless steel plate. A clear glass was obtained with the following properties:

| | |
|---|---|
| pH, 1 wt % solution | 7.3 |
| Average chain length by wet assay | 16 |
| Average chain length by nuclear magnetic resonance (NMR) | 12 |
| X-ray analysis - amorphous | |
| solubility g/100 g $H_2O$ at 20° C. | ~130 |

The relative mole % of the various phosphate in the product by NMR was:

| Phosphate | Mole % |
|---|---|
| Orthophosphate | 1 |
| Pyrophosphate | 6 |
| Tripolyphosphate | 9 |
| Long chain phosphates (i.e., containing 12 to 18 phosphorus atoms) | 84 |

EXAMPLE 2

STPP (46.0 g) and 18.8 g of 85 wt% $H_3PO_4$ were blended together in a platinum dish forming a damp solid mass. No water was used in this preparation. The material was heated at 950° C. for 30 minutes and quickly cooled.

Properties of the colorless glass

| | |
|---|---|
| pH of 1 wt % solution | 7.5 |
| Average chain length by wet assay | 17.2 |

EXAMPLE 3

A wet mix was prepared by charging 3000 gallons (13638 L) of water, 735 gallons (3341 L) of 86 wt% $H_3PO_4$, and 12 short tons (10.9 metric tons) of STPP to a SHMP wet mix tank. The mix tank contents were adjusted to a mix ratio of sodium to phosphorus of 1.077 and 56° Baume (1.63 g/mL) by addition of phosphoric acid and water.

The wet mix was fed into a furnace at 2100° F. (1149° C.) at a 1200 pounds/hour (544 Kg/hour) production rate. Melt discharged from the furnace was rapidly cooled on a "chill wheel" to produce SHMP.

Laboratory tests showed that the above product was equivalent to commercial SHMP produced by the standard process employing sodium carbonate and phosphoric acid:

| SHMP | FROM STPP/$H_3PO_4$ | FROM $Na_2CO_3$/$H_3PO_4$ |
|---|---|---|
| Appearance | Colorless Glass | Colorless Glass |
| pH, 1 wt % solution | 6.8 | 6.7 |
| Fe, ppm | 40 | 38 |
| Average chain length | ~19 | ~18 |
| wt % $P_2O_5$ | 66.4 | 67.0 |

EXAMPLE 4

In a platinum dish was mixed 31.3 g STPP, 3.99 g TSPP, 0.03 g cyclic trimetaphosphate, 0.03 g carbon black, and 16.1 g of 85 wt% phosphoric acid. The paste was mixed well and was heated for 50 minutes at 975° to 1000° C. The resulting clear melt was chilled on a stainless steel plate to give a clear glass. NMR analysis of the sample showed the following species:

| | |
|---|---|
| Orthophosphate | 0 mole % |
| Pyrophosphate | 2 mole % |
| Tripolyphosphate | 7 mole % |
| Long chain (glassy) phosphates | 91 mole % |
| Average chain length = 12 ± 0.5 | |

This experiment demonstrates that STPP that is off-spec in composition can be used to make SHMP according to the process of this invention.

I claim:

1. A method of making sodium hexametaphosphate having the general formula $Na_{x+2}P_xO_{3x+1}$ where x is 12 to 18, comprising mixing a phosphate selected from the group consisting of sodium tripolyphosphate, tetrasodium pyrophosphate, trisodium phosphate, and mixtures thereof with phosphoric acid, heating to form a melt, and cooling to form said hexametaphosphate.

2. A method according to claim 1 wherein said phosphate is sodium tripolyphosphate.

3. A method according to claim 1 wherein said phosphate is off-spec.

4. A method according to claim 1 wherein said phosphate has a particle size less than 100 mesh.

5. A method according to claim 1 Wherein said phosphate has a density of greater than 0.9 g/cc or less than 0.4 g/cc 6. A method according to claim 1 wherein said phosphate has a Phase 1 content of greater than 40 or less than 24 wt%.

7. A method according to claim 1 wherein said phosphate is off-white, grey, or black due to carbonaceous contamination.

8. A method according to claim 1 wherein x is 14.

9. A method according to claim I wherein said melt is at a temperature of about 900° to about 1200° C. for about 10 to about 90 minutes.

10. A method of making sodium hexametaphosphate comprising
(1) mixing sodium tripolyphosphate, which has
(a) a particle size of less than 100 mesh;
(b) a density greater than 0.9 g/cc;
(c) a density less than 0.4 g/cc;
(d) a Phase 1 content greater than 40 wt%;
(e) a Phase 1 content less than 24 wt%;
(f) contains more than 6 wt% tetrasodium pyrophosphate;
(g) contains more than 0.1 wt% insolubles; or
(h) has a $P_2O_5$ content less than 56.5%; or
(i) is off-white, grey, or black due to carbonaceous contamination, with phosphoric acid in a molar ratio of about 3.2 moles of sodium tripolyphosphate to about 4.4 moles of phosphoric acid;
(2) heating said mixture to form a melt; and
(3) cooling said melt.

11. A method according to claim 10 wherein said melt is at a temperature of about 900° to about 1200° C. for about 10 to about 90 minutes.

12. A method of making sodium hexametaphosphate comprising
(1) mixing sodium tripolyphosphate, which has
(a) a particle size of less than 100 mesh;
(b) a density greater than 0.9 g/cc;
(c) a density less than 0.4 g/cc;
(d) a Phase 1 content greater than 40 wt%;
(e) a Phase 1 content less than 24 wt%;
(f) contains more than 6 wt% tetrasodium pyrophosphate;
(g) contains more than 0.1 wt% insolubles;
(h) has a $P_2O_5$ content less than 56.5%; or
(i) is off-white, grey, or black due to carbonaceous contamination,
with phosphoric acid in a molar ratio of about 3.2 moles of sodium tripolyphosphate to about 4.4 moles of phosphoric acid in a furnace at a temperature sufficient to form a molten glass; and
(2) cooling said molten glass.

13. A method according to claim 12 wherein said molten glass is at a temperature of about 900° to about 1200° C. for about 10 to about 90 minutes.

14. A method according to claim 2 wherein about 3.2 moles of said sodium tripolyphosphate are reacted with about 4.4 moles of said phosphoric acid according to the equation $3.2\ Na_5P_3O_{10}°4.4\ H_3PO_4 \rightarrow Na_{16}P_{14}O_{43} + 6.6\ H_2O$.

* * * * *